(12) United States Patent
Kenawy et al.

(10) Patent No.: US 8,783,996 B2
(45) Date of Patent: Jul. 22, 2014

(54) INSERT RING FOR SPLINE COUPLING

(75) Inventors: Nasr Kenawy, Oakville (CA); Seham Kenawy, legal representative, Oakville (CA); Joseph H. Brand, Mississauga (CA); Richard Kostka, Bolton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/532,943

(22) Filed: Jun. 26, 2012

(65) Prior Publication Data

US 2013/0343815 A1 Dec. 26, 2013

(51) Int. Cl.
*F16D 1/10* (2006.01)

(52) U.S. Cl.
USPC ...................................... 403/359.1

(58) Field of Classification Search
USPC ............. 403/298, 359.1–359.6; 464/162, 182
See application file for complete search history.

(56) References Cited

U.S. PATENT DOCUMENTS

| | | | | |
|---|---|---|---|---|
| 2,089,168 A | * | 8/1937 | Brown | 403/259 |
| 2,508,832 A | * | 5/1950 | McAninch | 403/359.6 |
| 3,191,735 A | * | 6/1965 | Wavak | 192/110 R |
| 3,527,120 A | * | 9/1970 | Duer et al. | 475/235 |
| 3,574,366 A | * | 4/1971 | Thostenson | 403/359.5 |
| 4,153,260 A | * | 5/1979 | Joyner | 277/500 |
| 5,460,574 A | * | 10/1995 | Hobaugh | 464/162 |
| 6,183,230 B1 | * | 2/2001 | Beardmore et al. | 418/171 |
| 6,283,867 B1 | * | 9/2001 | Aota et al. | 464/74 |
| 6,705,946 B2 | * | 3/2004 | Bridges | 464/8 |
| 7,007,783 B2 | * | 3/2006 | Gerathewohl et al. | 192/70.2 |
| 8,409,019 B2 | * | 4/2013 | Ogawa et al. | 464/9 |
| 2010/0254752 A1 | | 10/2010 | Shook | |

FOREIGN PATENT DOCUMENTS

GB 992967 A 5/1965

* cited by examiner

*Primary Examiner* — Joshua Kennedy
(74) *Attorney, Agent, or Firm* — Norton Rose Fulbright Canada LLP

(57) ABSTRACT

A spline coupling comprises a male spline having a plurality of spline teeth separated by keyways. An insert ring comprises a plurality of U-shaped segments each having a pair of side walls separated by a gap and interconnected by a proximal end wall. Each U-shaped segment is configured to be received in one of the keyways of the male spline with the side walls being against surfaces of the keyway and the gap leaving a portion of the keyway exposed. Each U-shaped segment is connected to adjacent U-shaped segments by a distal end wall to leave a portion of the spline teeth exposed between each pair of adjacent U-shaped segments. A female spline has a shape complementary to that of a combination of the male spline and insert ring for coupling engagement therebetween.

15 Claims, 4 Drawing Sheets

INSERT RING FOR SPLINE COUPLING

TECHNICAL FIELD

The application generally relates to spline couplings of the type used between gearboxes and shafts, and more particularly to an insert ring used as an interface between male and female couplings.

BACKGROUND ART

As the drive splines of gearbox gears tend to wear, several different methods are used to minimize this wear. The splines can be case-hardened steel, and either lubricated by a continuous flow of oil or packed with grease. The other system used is a non-lubricated "plastic" spline coupling insert, as an intermediate piece, that is splined on both its inner and outer diameters. This insert fits between the steel splines of the accessory gearbox drive and the spline on the accessory shaft itself.

The plastic spline coupling insert, while not requiring any lubrication, may increase the size of not only the gearbox shaft, but also the bearing that is supporting the end of the shaft. Additionally, the housing also grows in size to accommodate the bearing/shaft. This increase in shaft size may also result in an increase in the size of the shaft seal, resulting in higher seal rubbing speeds, making the seals prone to leakage.

SUMMARY

Accordingly, from a broad aspect, there is provided an insert ring for a spline coupling comprising a plurality of U-shaped segments each having a pair of side walls separated by a gap and interconnected by a proximal end wall, each U-shaped segment configured to be received in a keyway of a male spline with the side walls being against surfaces of the keyway and the gap leaving a portion of the keyway exposed, each U-shaped segment connected to adjacent U-shaped segments by a distal end wall to leave a portion of a spline tooth exposed between each pair of adjacent U-shaped segments.

According to another broad aspect, there is provided a spline coupling comprising: a male spline having a plurality of spline teeth separated by keyways; an insert ring comprising a plurality of U-shaped segments each having a pair of side walls separated by a gap and interconnected by a proximal end wall, each U-shaped segment configured to be received in one of the keyways of the male spline with the side walls being against surfaces of the keyway and the gap leaving a portion of the keyway exposed, each U-shaped segment connected to adjacent U-shaped segments by a distal end wall to leave a portion of the spline teeth exposed between each pair of adjacent U-shaped segments; and a female spline having a shape complementary to that of a combination of the male spline and insert ring for coupling engagement therebetween.

Further details of these and other aspects of the present invention will be apparent from the detailed description and figures included below.

BRIEF DESCRIPTION OF THE DRAWINGS

Referring now to the accompanying drawings.

DETAILED DESCRIPTION

Figure 1:
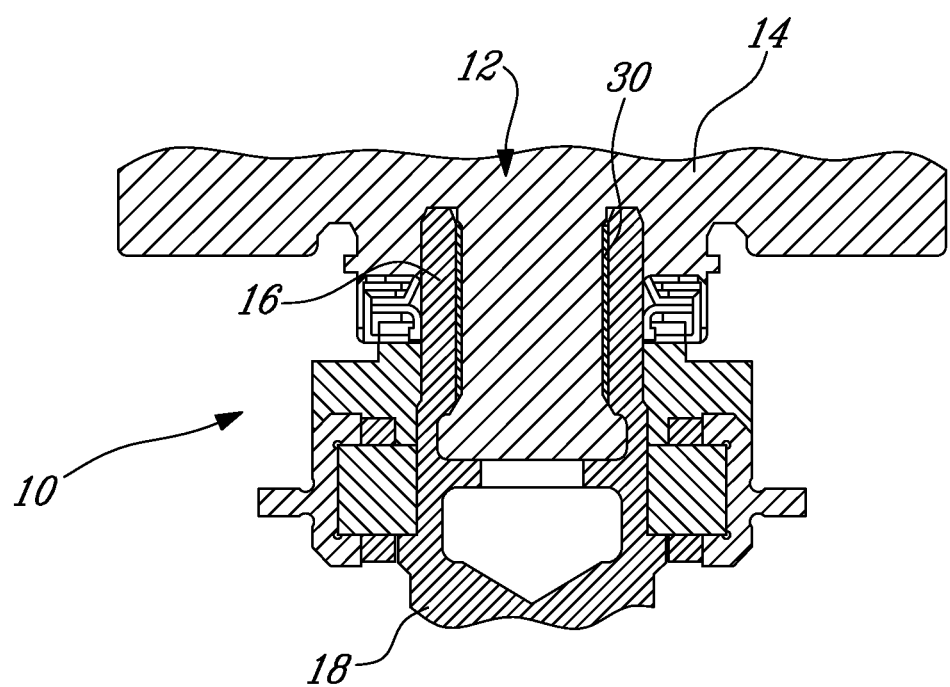
FIG. 1 is a schematic sectional view of a spline coupling between an accessory gear box and a spline shaft in accordance with an embodiment of the present disclosure.

Referring to FIG. 1, there is illustrated a spline coupling 10 between a male spline 12 of a drive shaft 14, and a female spline 16 of a gearbox 18. The gearbox 18 may be used in gas turbine engines of aircraft and like vehicles. The male spline 12 may also be referred to as an external spline, while the female spline 16 may be referred to as an internal spline. Although the male spline 12 is illustrated as being on the driven end of the drive shaft 14, the male spline 12 could be on the driving end of the spline coupling 10.

Figure 2:
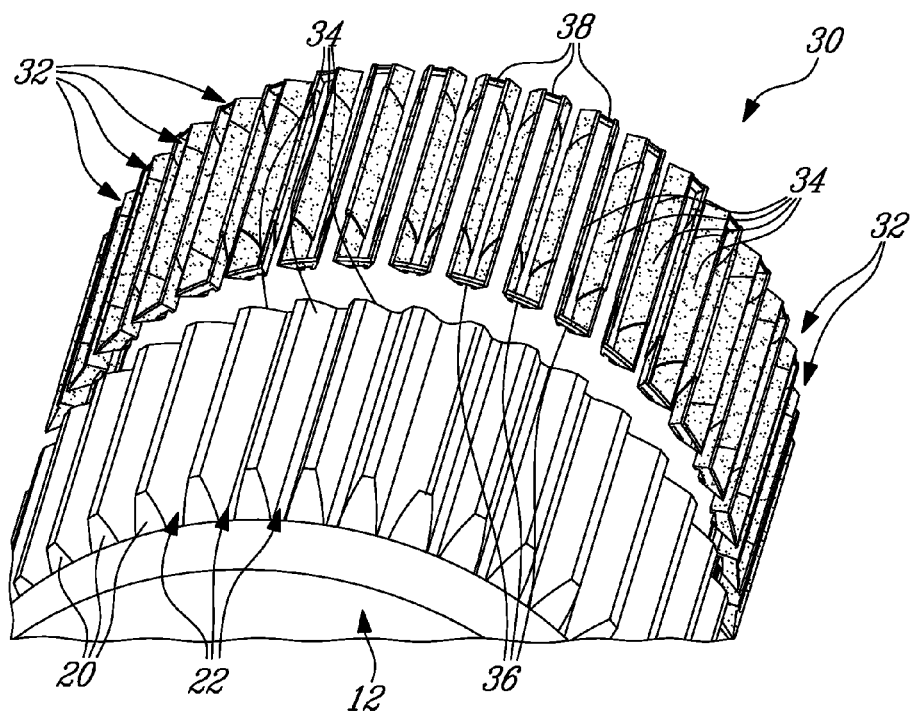
FIG. 2 is an assembly view of a male spline and insert ring in accordance with an embodiment of the present disclosure.
Figure 3:
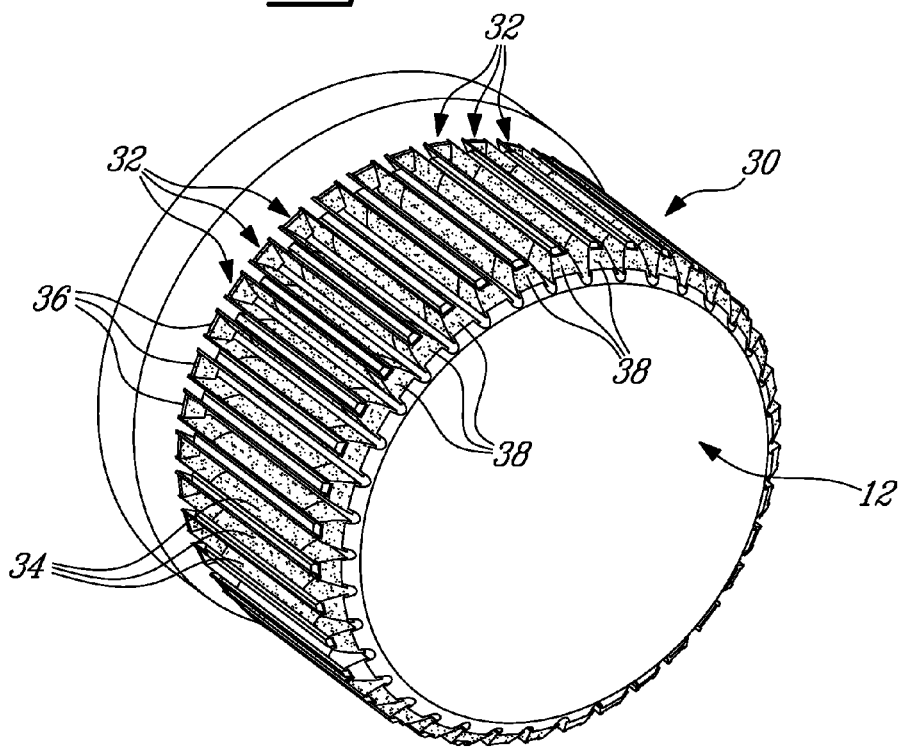
FIG. 3 is a perspective view of the insert ring as mounted to the male spline.
Figure 4:
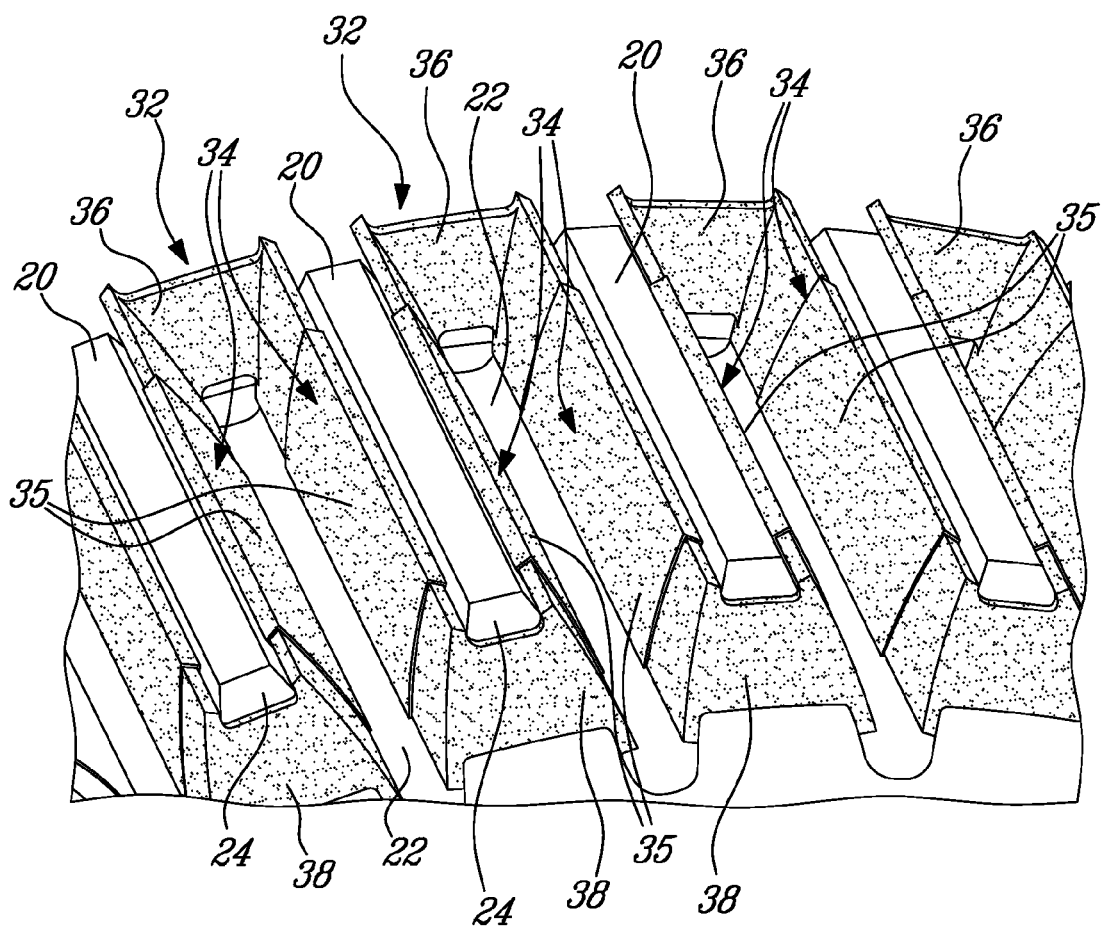
FIG. 4 is an enlarged view of the insert ring mounted to the male spline.

Referring concurrently to FIGS. 2 to 4, the male spline 12 has a plurality of spline teeth 20. The spline teeth 20 extend in an axial direction of the spline coupling and are generally equidistantly spaced apart from one another, on a circumference of the male spline 12. The teeth 20 are separated by keyways 22. There may be more or fewer of the teeth 20 and hence keyways 22 on the male spline 12, than what is shown in the illustrated embodiments. In the illustrated embodiment, the teeth 20 have a generally trapezoid sectional shape with the keyways 22 having a complementary sectional shape. The teeth 20 and keyways 22 may have any other suitable sectional shape. Each tooth 20 has a distal end face 24. In the illustrated embodiment, the distal end faces 24 are slanted, but may also have alternate orientations An insert ring 30 is placed on the male spline 12. Hence, the insert ring 30 is the interface between the male spline 12 and the female spline 16 (FIG. 1). In the embodiment of FIGS. 2 to 4, the insert ring 30 is made of a single integrally-molded piece. The insert ring 30 is constituted of a plurality of interconnected insert segments 32. There may be one insert segment 32 per keyway 22. Referring to FIG. 4, each insert segment 32 has a pair of radial side walls 34. The walls 34 are referred to as radial side wall as they extend in a generally radial orientation, i.e., not necessarily substantially radial. When the insert ring 30 is mounted onto the male spline 12 as in FIGS. 3 and 4, the radial side walls 34 lie against the side walls of adjacent teeth 20. The radial side walls 34 may each have a raised wear pad 35 as observed in FIG. 4, to increase the life of the insert ring 30. The radial side walls 34 of a segment 32 are interconnected by a proximal axial end wall 36. Hence, the proximal axial end walls 36 may axially align the male spline 12 and the female spline 16 (FIG. 1) by abutment with the teeth of the female spline. Distal axial end walls 38 are shared between adjacent insert segments 32. The distal axial end walls 38 therefore lie against the end faces 24.

The radial side walls 34 and the proximal axial end wall 36 of each insert segment 32 concurrently define a U-shape, with a gap being defined between the radial side walls 34. As a result, as seen in FIG. 4, a surface of the keyway 22 of the male spline 12 remains exposed, as do the radially outermost surfaces of the teeth 20 when the insert ring 30 is positioned onto the male spline 12.

According to an embodiment, the male spline 12 is a standard shape male spline (e.g., ANSI standard), and hence is not specifically machined to allow the use of the insert ring 30. In such a case, the female spline is therefore modified from standard so as to be coupled with the combination of the male spline 12 and insert ring 30 of FIG. 3. In an embodiment, the pitch diameter of both the male spline 12 and female spline 16 is the same as without the insert ring 30. More specifically, the female spline (e.g., part of the gearbox shaft) is modified; as the tooth thickness of the spline may be reduced slightly as a function of the thickness of the insert ring 30. The insert ring 30 may thus be relatively thin, allowing the use of shaft, bearing, and seal of "standard" size, and not the oversized components usually required with a plastic insert. This allows the use of all current accessories, without any modification. This may minimize the weight of the spline drive components. Moreover, because of the U shape of the segments 32, the insert ring 30 is held captive in the spline coupling, whereby a retaining ring is not required to retain the insert ring 30.

Figure 5:
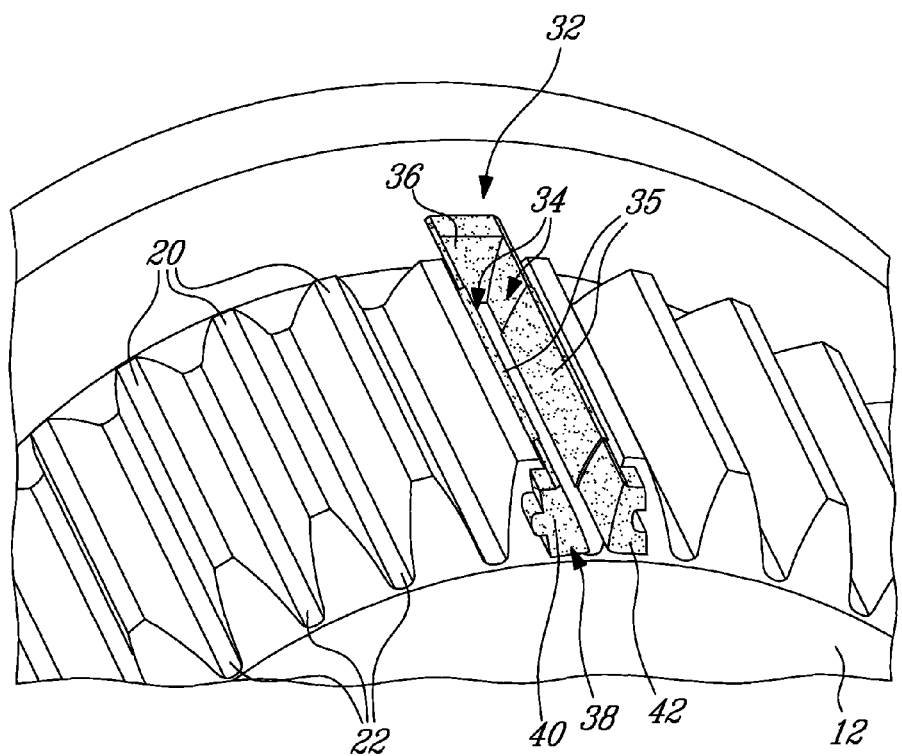
FIG. 5 is a perspective view of an insert segment on a male spline in accordance with another embodiment of the present disclosure.
Figure 6:
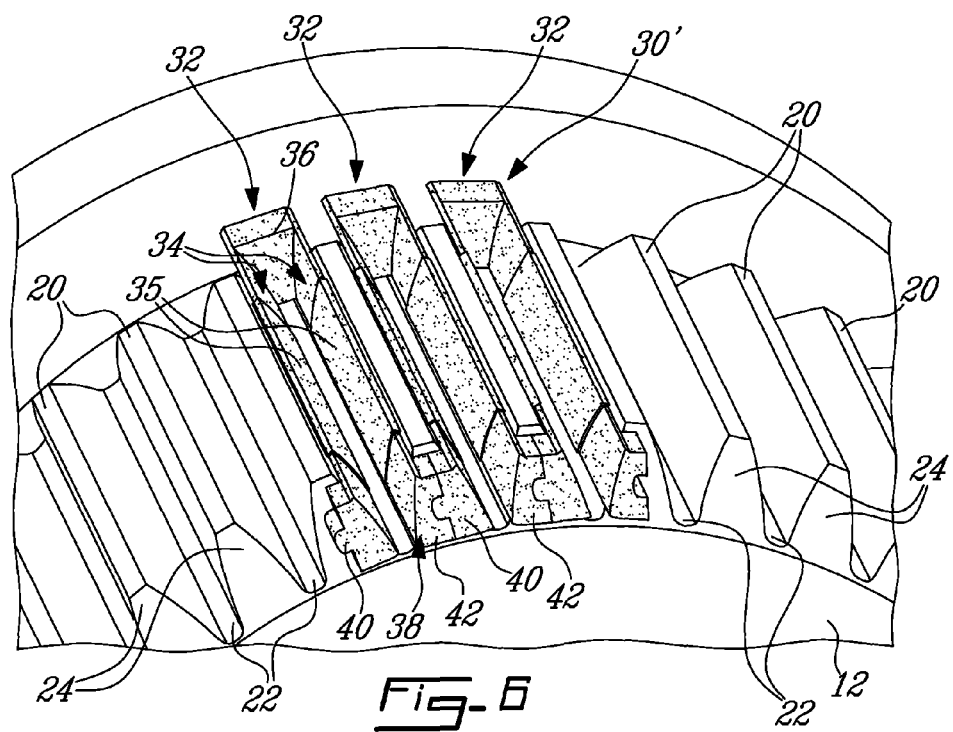
FIG. 6 is a perspective view of three insert segments interlocked with one another as mounted to the male spline.

Referring to FIGS. 5 and 6, another embodiment of the insert ring is shown at 30'. Instead of being molded integrally into a single piece, the insert ring 30' is constituted of a plurality of the insert segments 32 interconnected to one another, but molded as separate parts. Therefore, like numerals between the embodiments of FIGS. 2 to 4 and FIGS. 5 to 6 represent like elements.

The distal axial end walls 38 interrelating adjacent insert segments 32 are made of interlocking male portion 40 and female portion 42. Each of the insert segments 32 therefore has one of the interlocking male portions 40 and one of the interlocking female portions 42.

As shown in FIG. 6, when adjacent insert segments 32 are interconnected, the male portion 40 of one of the insert segments 32 is mated to the female portion 42 of the adjacent insert segment 32. FIGS. 5 and 6 show one of multiple configurations considered for the interlocking of the male portion 40 to the female portion 42. Moreover, the male portion 40 and the female portion 42 may be simply interconnected as opposed to interlocked. The interlocking may facilitate the assembly and retention of the insert ring 30' on the male spline 12.

Any appropriate material may be used for the insert ring 30/30', such as plastics. For instance, a plastic well suited for use as the material for the insert ring 30/30' is Vespel®. Any other appropriate materials may be used as well. The plastics used are preferably with a relatively high hardness and low resilience. Accordingly, the trough like shape of the insert segments 32 may cause a self centering of the female spline 16 (FIG. 1) coupled to the male spline 12.

The above description is meant to be exemplary only, and one skilled in the art will recognize that changes may be made to the embodiments described without departing from the scope of the invention disclosed. For example, the spline coupling configuration could be used in applications other than gas turbine engines. Any appropriate material may be used for the insert ring, and any appropriate interconnection configuration between adjacent insert ring segments is considered, when the insert ring is not one integrally-molded piece. Still other modifications which fall within the scope of the present invention will be apparent to those skilled in the art, in light of a review of this disclosure, and such modifications are intended to fall within the appended claims.

What is claimed is:

1. An insert ring for a spline coupling comprising a plurality of U-shaped segments each having a pair of side walls separated by a gap and interconnected only by a proximal end wall, each U-shaped segment configured to be received in a keyway between male spline teeth such that the side walls are configured to bear/abut against surfaces of the keyway and the gap configured to leave a portion of the keyway exposed, each U-shaped segment connected to adjacent U-shaped segments only by a distal end wall such that a portion of a spline tooth is configured to be exposed between each pair of adjacent U-shaped segments by proximal openings defined between the proximal end walls of adjacent pairs of the U-shaped segments sized to allow the male spline teeth to pass therethrough.

2. The insert ring according to claim 1, wherein the plurality of U-shaped segments are integrally molded into a single piece.

3. The insert ring according to claim 1, wherein the distal end walls each comprise interconnected male and female portions releasably interconnecting the U-shaped segments.

4. The insert ring according to claim 1, wherein each said proximal end wall is adapted to abut a surface of the keyway.

5. The insert ring according to claim 1, wherein each said distal end wall is adapted to abut an end surface of a corresponding spline tooth.

6. The insert ring according to claim 1, wherein the insert ring is made of plastic.

7. The insert ring according to claim 1, further comprising a raised wear pad in each of the sidewalls of the U-shaped segments.

8. A spline coupling comprising:
a male spline having a plurality of spline teeth separated by keyways;
an insert ring comprising a plurality of U-shaped segments each having a pair of side walls separated by a gap and interconnected only by a proximal end wall, each U-shaped segment configured to be received in one of the keyways of the male spline with the side walls being against surfaces of the keyway and the gap leaving a portion of the keyway exposed, each U-shaped segment connected to adjacent U-shaped segments only by a distal end wall to leave a portion of the spline teeth exposed between each pair of adjacent U-shaped segments, a distal opening being defined between the distal end walls of adjacent pairs of the U-shaped segments, and sized to allow spline teeth of a female spline to pass therethrough; and
the female spline having a shape complementary to that of a combination of the male spline and insert ring for coupling engagement therebetween, with the spline teeth of the female spline passing through the distal openings during the coupling engagement.

9. The spline coupling according to claim 8, wherein the plurality of U-shaped segments are integrally molded into a single piece.

10. The spline coupling according to claim 8, wherein the distal end walls each comprise interconnected male and female portions releasably interconnecting the U-shaped segments.

11. The spline coupling according to claim 8, wherein each said proximal end wall is adapted to abut a surface of the keyway.

12. The spline coupling according to claim 8, wherein each said distal end wall is adapted to abut an end surface of a corresponding spline tooth.

13. The spline coupling according to claim 8, wherein the insert ring is made of plastic.

14. The spline coupling according to claim 8, wherein the female spline is part of a driving shaft of a gearbox.

15. The spline coupling according to claim 8, further comprising a raised wear pad in each of the sidewalls of the U-shaped segments.

\* \* \* \* \*